United States Patent
Kitamura et al.

(10) Patent No.: US 11,407,411 B2
(45) Date of Patent: Aug. 9, 2022

(54) OTHER LANE MONITORING DEVICE

(71) Applicant: DENSO CORPORATION, Kariya (JP)

(72) Inventors: Takayuki Kitamura, Kariya (JP); Naotsugu Shimizu, Kariya (JP); Koichiro Suzuki, Yokohama (JP)

(73) Assignee: DENSO CORPORATION, Kariya (JP)

(*) Notice: Subject to any disclaimer, the term of this patent is extended or adjusted under 35 U.S.C. 154(b) by 494 days.

(21) Appl. No.: 16/337,031

(22) PCT Filed: Sep. 27, 2017

(86) PCT No.: PCT/JP2017/035000
§ 371 (c)(1),
(2) Date: Mar. 27, 2019

(87) PCT Pub. No.: WO2018/062291
PCT Pub. Date: Apr. 5, 2018

(65) Prior Publication Data
US 2020/0031341 A1    Jan. 30, 2020

(30) Foreign Application Priority Data

Sep. 29, 2016  (JP) .............................. JP2016-191376

(51) Int. Cl.
*B60W 30/095* (2012.01)
*B60W 40/10* (2012.01)
*G08G 1/16* (2006.01)
*G06V 20/58* (2022.01)

(52) U.S. Cl.
CPC .... *B60W 30/0956* (2013.01); *B60W 30/0953* (2013.01); *B60W 40/10* (2013.01); *G06V 20/584* (2022.01); *G08G 1/166* (2013.01); *G08G 1/167* (2013.01); *B60W 2520/06* (2013.01)

(58) Field of Classification Search
CPC ...................... B60W 30/0956; B60W 30/0953
See application file for complete search history.

(56) References Cited

U.S. PATENT DOCUMENTS

2005/0179580 A1    8/2005  Cong et al.
2012/0291707 A1   11/2012  Granneman
(Continued)

FOREIGN PATENT DOCUMENTS

JP         10-239436 A          9/1998
JP     2005173899 A  *    1/2000
(Continued)

OTHER PUBLICATIONS

Machine Translation of Hidekazu's reference (JP-2005173899-A) (Year: 2005).*
(Continued)

*Primary Examiner* — Elaine Gort
*Assistant Examiner* — Tarek Elarabi
(74) *Attorney, Agent, or Firm* — Maschoff Brennan (57) ABSTRACT

An other lane monitoring device of the present disclosure includes an other vehicle acquisition section, a path acquisition section, a lane estimation section, and a position estimation section. The other vehicle acquisition section is configured to acquire other vehicle position information that indicates the current position of an other vehicle near the own vehicle. The path acquisition section is configured to acquire an own vehicle travel path that indicates a path along which the own vehicle has traveled. The lane estimation section is configured to use the own vehicle travel path as a basis for estimating an other lane area that is a lane where the other lane is present. The position estimation section is configured to estimate a future position of the other vehicle, assuming that the other vehicle moves along the own vehicle travel path or in the other lane area.

7 Claims, 8 Drawing Sheets

(56) References Cited

U.S. PATENT DOCUMENTS

| | | |
|---|---|---|
| 2014/0044311 A1 | 2/2014 | Takahashi |
| 2016/0203376 A1* | 7/2016 | Ishigami ................. G06T 7/292 382/103 |
| 2017/0076935 A1 | 3/2017 | Granneman |
| 2017/0345312 A1 | 11/2017 | Shimizu et al. |

FOREIGN PATENT DOCUMENTS

| | | | |
|---|---|---|---|
| JP | 2012256242 A | * | 1/2000 |
| JP | 2005-173899 A | | 6/2005 |
| JP | 2005-539288 A | | 12/2005 |
| JP | 2012-256242 A | | 12/2012 |
| JP | 2013-511841 A | | 4/2013 |
| JP | 2015-41238 A | | 3/2015 |
| JP | 2015-161967 A | | 9/2015 |
| JP | 2016-085567 A | | 5/2016 |
| WO | 2012147187 A1 | | 11/2012 |
| WO | WO-2015025897 A1 * | 2/2015 | ............... G06T 7/70 |

OTHER PUBLICATIONS

Machine Translation of Hiromitsu's reference (JP-2012256242-A) (Year: 2012).*

Wikipedia, Dead rocking, 2014, https://web.archive.org/web/20141016014627/http://en.wikipedia.org/wiki/Dead_reckoning (Year: 2014).*

* cited by examiner

$\hat{e}_n(0) = [1,0]^T$ $\hat{e}_n(n+1) = \text{Rot}_{-\Delta\theta(0)} \hat{e}_n(n)$ $\hat{e}_n(0)$ $\hat{e}_n(1)$ $\hat{e}_n(2)$ $\hat{e}_n(3)$

OTHER LANE MONITORING DEVICE

CROSS-REFERENCE TO RELATED APPLICATION

This application is a U.S. national phase application of International Application No. PCT/JP2017/035000 filed Sep. 27, 2017, which designated the U.S. and claims priority to Japanese Patent Applications No. 2016-191376, filed on Sep. 29, 2016, the contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an other lane monitoring device.

BACKGROUND ART

As the other lane monitoring device set forth above, PTL 1 below discloses a technique of setting a monitoring target area around an own vehicle, and monitoring a behavior of other vehicles in a monitoring target area.

CITATION LIST

Patent Literature

[PTL 1] JP 2016-085567 A

SUMMARY OF THE INVENTION

The inventors have studied the technique of PTL1 in detail and found that, with this technique, it is difficult to correctly estimate the behavior of the other vehicle because, according to the technique, the other vehicle is estimated to move according to the speed vector of the other vehicle. Furthermore, as a result of detailed studies, the inventors have found that it is difficult to track the other vehicle if the behavior of the other vehicle cannot be correctly estimated, in a configuration in which the location of the other vehicle is tracked, while the objects detected in a time-series manner are determined as to whether they arise from the same object.

It is preferred that, in an aspect of the present disclosure, an other lane monitoring device installed in an own vehicle correctly estimates the movement of an other vehicle, irrespective of the curvature of the road.

The other lane monitoring device according to an aspect of the present disclosure includes an other vehicle acquisition section, a path acquisition section, a lane estimation section, and a position estimation section.

The other vehicle acquisition section is configured to acquire an other vehicle position information that indicates the current position of the other vehicle near the own vehicle. The path acquisition section is configured to acquire an own vehicle travel path that indicates a path along which the own vehicle has traveled.

The lane estimation section is configured to use the own vehicle travel path as a basis for estimating an other lane area that is a lane where the other vehicle is present, the lane being different from an own lane where the own vehicle is present. The position estimation section is configured to estimate a future position of the other vehicle indicated by the other vehicle information, assuming that the other vehicle moves along the own vehicle travel path or in the other lane area.

According to the other lane monitoring device, a future position of the other vehicle is estimated, assuming that the other vehicle moves along the own vehicle travel path or in the other lane area. Thus, the movement of the other vehicle can be correctly estimated, irrespective of the curvature of the road.

The bracketed reference signs in the claims indicate correspondence with the specific means in the following embodiments each described as a mode, and should not limit the technical scope of the present disclosure.

DESCRIPTION OF THE EMBODIMENTS

With reference to the drawings, embodiments of the present disclosure will be described.

1. Embodiment

[1-1. Configuration]

Figure 1:
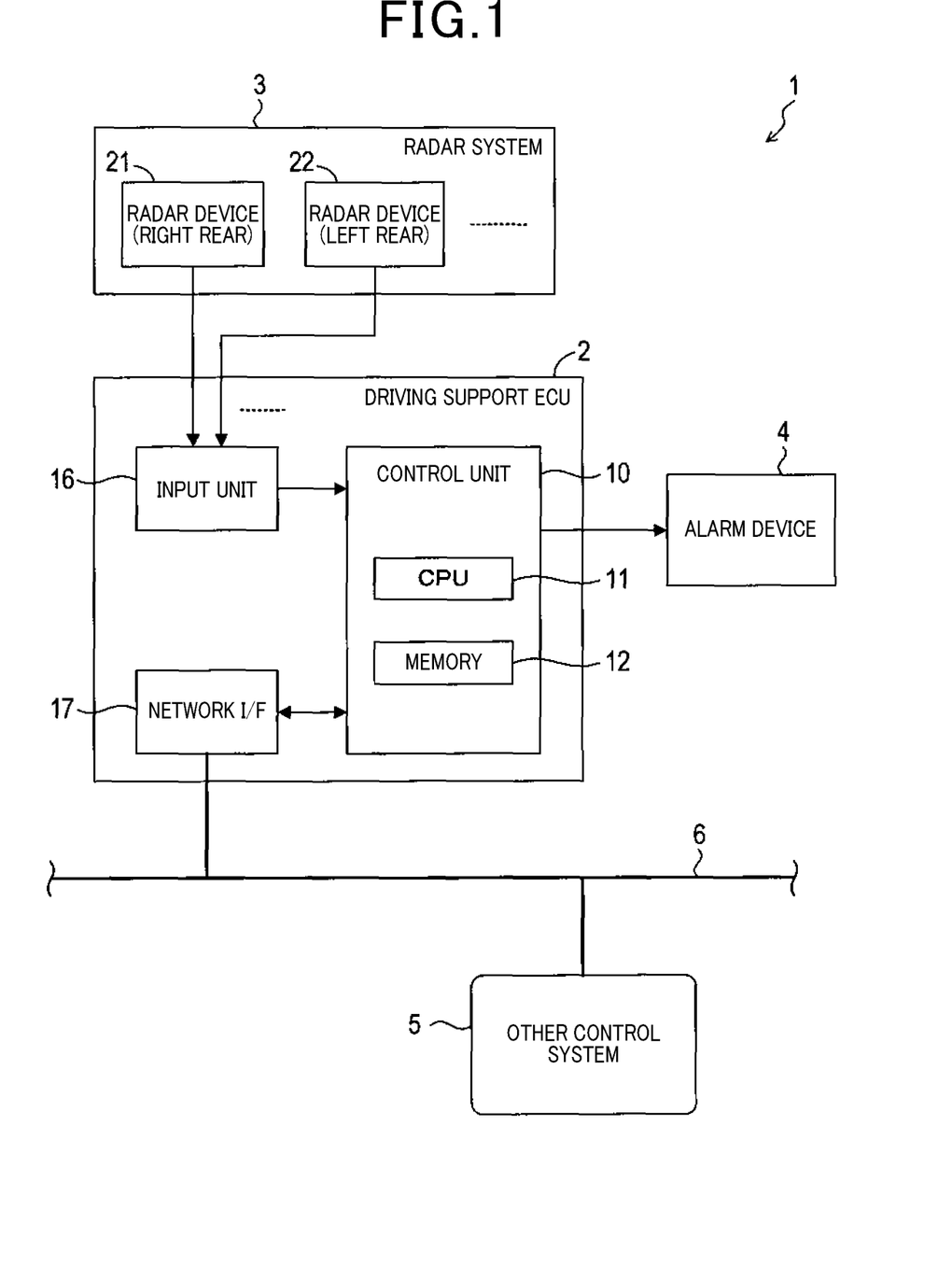
FIG. 1 is a block diagram illustrating a configuration of an in-vehicle system.

An in-vehicle system 1 of the present embodiment shown in FIG. 1 includes a driving support Electronic Control Unit (ECU) 2, a radar system 3, an alarm device 4, and another control system 5. In the present embodiment, the in-vehicle system 1 is installed in a vehicle that is a four-wheel vehicle. A vehicle equipped with the in-vehicle system 1 is hereinafter also referred to as an own vehicle.

The radar system 3 includes a plurality of radar devices 21, 22. As the radar devices, the present embodiment at least includes a right radar device 21 disposed on the right-rear side of the own vehicle, and a left radar device 22 disposed on the left-rear side of the own vehicle. The right radar device 21 acquires information of an object on the right side (including the right-rear side) of the own vehicle. The left radar device 22 acquires information of an object on the left side (including the left-rear side) of the own vehicle. If use of only one radar device enables acquisition of target information covering the entire region (including predetermined areas on the right-rear and left-rear sides of the vehicle) behind the vehicle, this one radar device in question may be used instead of the two radar devices 21 and 22. In the present embodiment, the object detected by a radar device is also referred to as a target.

The plurality of radar devices 21, 22 constituting the radar system 3 all have basically the same configuration and functions. Therefore, the following description is focused on the right radar device 21 as a representative.

The right radar device 21 emits radar, i.e., electromagnetic waves, and receives the reflected waves. Based on the received signal, the right radar device 21 calculates target information related to the target that is the object that has reflected the radar wave, and inputs the calculated target information into the driving support ECU 2. The target information calculated by the right radar device 21 includes a distance D from the own vehicle to the target, a relative speed V of the target relative to the own vehicle, and an azimuth tp of the target with reference to the own vehicle.

Various target detection methods are known for use in radar devices, including the FMCW method, the dual-frequency CW method, and other methods. The right radar device 21 of the present embodiment will be described as an example of a device which is configured as a millimeter-wave radar based on the FMCW method.

Since the target detection method used in millimeter-wave radars based on the FMCW method is well known, detailed description will be omitted. The right radar device 21 uses a known signal processing method to calculate the target information D, V and φ, and outputs the calculated information D, V and φ to the driving support ECU 2.

The other control system 5 installed in the own vehicle includes several ECUs other than the driving support ECU 2. In the present embodiment, the several ECUs other than the driving support ECU 2 are collectively referred to as the other control system 5 for the sake of simplification.

The driving support ECU 2 is connected to the other control system 5 via a network 6 to establish communication with the other control system 5. The network 6 may use communication of a desired protocol. The present embodiment uses the known CAN (Controller Area Network; trademark) as an in-vehicle network.

Various pieces of odometry information are periodically transmitted to the network 6 from the other control system 5. The driving support ECU 2 can acquire the odometry information periodically transmitted to the network 6. The acquired odometry information periodically transmitted to the network 6 includes a speed of the own vehicle (hereinafter, referred to as vehicle speed) v, a yaw rate ω of the own vehicle, a steering angle of the own vehicle, a turning radius R of the own vehicle.

The vehicle speed v is calculated by the other control system 5 based on a detection signal derived from a known vehicle speed sensor, not shown, and the results of the calculation are periodically transmitted to the network 6 as vehicle speed data. The yaw rate ω is calculated by the other control system 5 based on a detection signal derived from a known yaw rate sensor, not shown, and the results of the calculation are periodically transmitted to the network 6 as yaw rate data.

The steering angle, or a steering amount, is calculated by the other control system 5 based on a detection signal derived from a known steering angle sensor, not shown, and the results of the calculation are periodically transmitted to the network 6 as steering angle data. The turning radius R is calculated by the other control system 5 by using a predetermined R calculation method which is based on a steering angle, and the results of the calculation are periodically transmitted to the network 6 as R data.

There are various methods that can be used for the R calculation method. For example, the R calculation method may be one that uses a table prepared in advance, containing correlation between the steering angle and the turning radius R. The turning radius R may be calculated by the driving support ECU 2 based on the steering angle acquired via the network 6, and using the table.

The driving support ECU 2 includes a control unit 10, an input unit 16, and a network interface 17. It should be noted that the network interface 17 is hereinafter abbreviated as network I/F 17.

The input unit 16 outputs target information, which is received from the radar devices 21, 22 constituting the radar system 3, to the control unit 10. The network I/F 17 is a communication I/F for allowing the control unit 10 to perform data communication with the other control system 5 via the network 6.

The control unit 10 is mainly constituted by a well-known microcomputer having a CPU 11 and a semiconductor memory (hereinafter, referred to as a memory 12) such as a RAM, a ROM, or a flash memory. The various functions of the control unit 10 are implemented by the CPU 11 executing programs stored in a non-transitory tangible recording medium. In the present example, the memory 12 corresponds to the non-transitory tangible recording medium in which the programs are stored. With these programs being executed, methods corresponding to the programs are executed.

It should be noted that the non-transitory tangible recording medium refers to a recording medium from which electromagnetic waves are excluded. The control unit 10 may include one or more microcomputers.

The control unit 10 has an adjacent lane monitoring function as a functional configuration implemented by the CPU 11 executing the program. The adjacent lane monitoring function is used for determining whether another vehicle is traveling in a lane adjacent to the traveling lane of the own vehicle, and if another vehicle is traveling in the adjacent lane and the traveling state of the other vehicle satisfies specific conditions, the alarm device 4 is activated to output an alarm. The adjacent lane monitoring function is implemented using the odometry information acquired from the other control system 5 via the network 6, the target information acquired from the radar system 3 (mainly, the right and left radar devices 21 and 22), and other information.

The control unit 10 executes various processes based on the pieces of target information D, V and φ individually received, via the input unit 16, from the radar devices 21, 22 constituting the radar system 3. These processes are performed for each of the radar devices 21, 22.

The method of implementing these elements constituting the control unit 10 should not be limited to software-based methods, but the method may be implemented using a single hardware component or a plurality of hardware components for part or all of the elements. For example, if the functions are implemented by an electronic circuit as a hardware component, the electronic circuit may be implemented by a digital circuit including a number of logic circuits, or an analog circuit, or a combination thereof.

[1-2. Processing]

Figure 2:
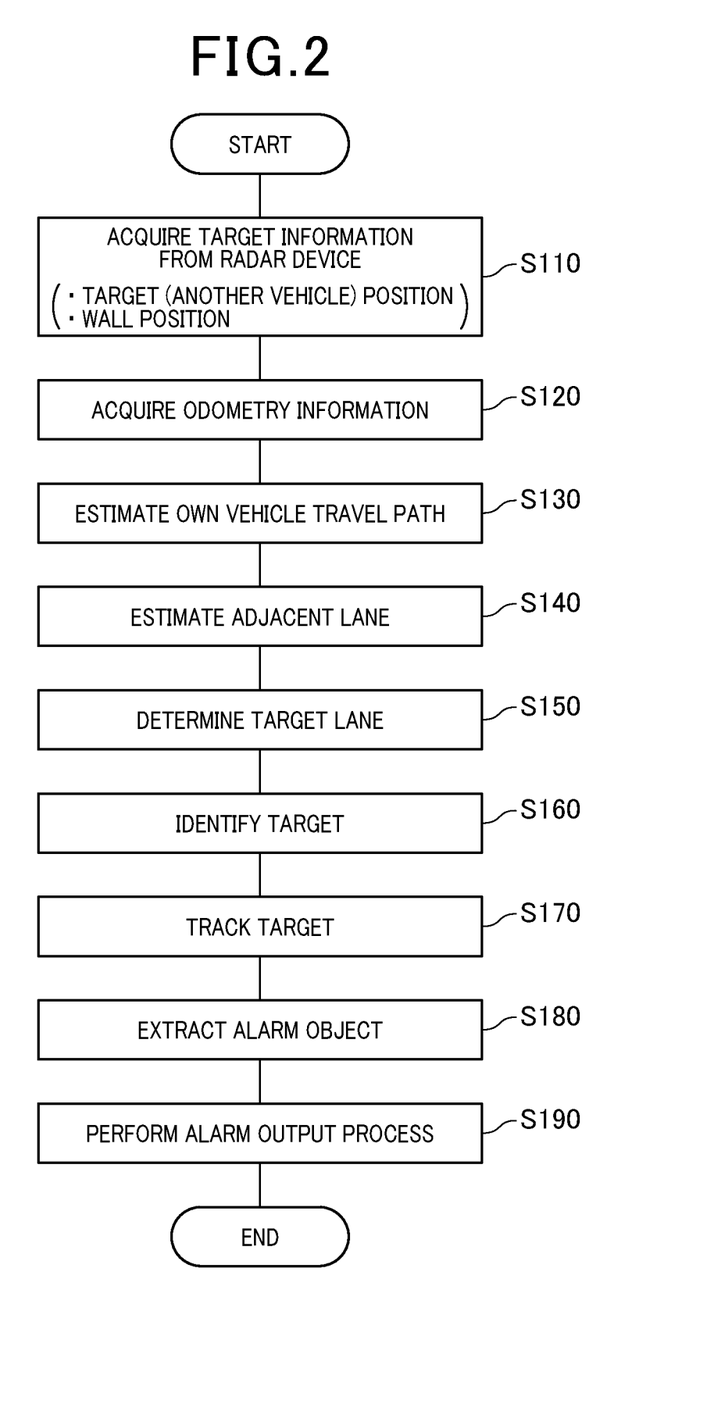
FIG. 2 is a flow diagram illustrating an adjacent lane monitoring process executed by a CPU of a control unit.

Referring now to FIG. 2, an outline of an adjacent lane monitoring process executed by the control unit 10 will be described. The control unit 10 actually monitors the adjacent lanes on the left and right sides of the own vehicle. For the sake of simplification, however, the following description of the adjacent lane monitoring process based on FIG. 2 will be given assuming that the adjacent lane on the right side of the own vehicle is a target of monitoring. Accordingly, the following adjacent lane monitoring process performed for the right side of the own vehicle is applied to the left side of the own vehicle.

Upon start of the adjacent lane monitoring process shown in FIG. 2, the control unit 10 acquires, at S110, target information from the right radar device 21 via the input unit 16. The target information acquired at this step includes another vehicle position information regarding another vehicle as a target, and obstacle-position information regarding an obstacle. For example, if information is a moving object, it is recognized as another vehicle position information, and if information is a stationary object, it is recognized as obstacle-position information.

The other vehicle position information and the obstacle-position information each include, as mentioned above, a distance D to the target, a relative speed V of the target, and an azimuth tri of the target. Specifically, these pieces of position information each include a current position of the target and a current mobile vector of the target.

At S120, the control unit 10 acquires odometry information from the other control system 5 via the network 6. The odometry information acquired at this step at least includes, as mentioned above, a vehicle speed v, the yaw rate ω, a steering angle, and a turning radius R.

At S130, the control unit 10 estimates and acquires an own vehicle travel path. Specifically, the control unit 10 estimates an own vehicle travel path from the predetermined N cycles before the control cycles T to the present. It should be noted that N is a natural number that is, for example, 2 or more.

In the present embodiment, as will be described later, the control unit 10 calculates own vehicle estimated positions at respective control timings the N cycles before with reference to the current position, using the odometry information acquired at S120. The odometry information at this step indicates values acquired at respective control timings the N cycles before. Then, the control unit 10 connects the current position and the own vehicle estimated positions in these cycles with lines to produce an estimation of an own vehicle travel path.

The odometry information, such as a vehicle speed v, a yaw rate ω, or the like, acquired at S120 includes errors attributed to various factors, such as detection errors of the vehicle speed sensor or the yaw rate sensor, or noises. Therefore, at S130, the control unit 10 also calculates an estimated-position range, taking account of the errors that may be included in the odometry information, for each of the own vehicle estimated positions at the past control timings the N cycles before.

The estimated-position range can be expressed as an error variance with reference to the own vehicle estimated position. In the present embodiment, the error variance of an own vehicle estimated position attributed to the error factors of the odometry information is modelled as a normal distribution, e.g., Gaussian distribution.

It should be noted that the error variance indicates an index of variation of errors when measurements are iterated. The following description will be given using various formulas for the understanding of various processes. These formulas use elements, including time (timing) t, yaw rate $\omega_s$ (t), vehicle speed $v_s$ (t), attitude angle θ (t), attitude angle variation Δθ (t), and turning radius R, as defined by the following Formulas (1) to (6).

[Math. 1]

$$t=[0,-T,-2T,\ldots]\quad(1)$$

$$\omega_s(t)=[\omega_s(0),\omega_s(-T),\omega_s(-2,T),\ldots]\quad(2)$$

$$v_s(t)=[v_s(0),v_s(-T),v_s(-2T),\ldots]\quad(3)$$

$$\theta(t)=[0,-\omega_s(0)T,-(\omega_s(0)+\omega_s(-T))T,\ldots]\quad(4)$$

$$\Delta\theta(t)=\omega_s(t)\cdot T\quad(5)$$

$$R(t)=v_s(t)/\omega_s(t)\quad(6)$$

As described above, various calculations of the present embodiment are performed based on the own vehicle estimated position at each of past control timings up to the N cycles before, i.e., each t=-NT. The turning radius R described herein is assumed to be calculated using the above Formula (6). However, since the turning radius R of the present embodiment can also be acquired from the other control system 5 via the network 6, the turning radius R acquired from the other control system 5 may be used.

At S130, with reference to the current own vehicle position, i.e., using the current own vehicle position as an origin as expressed by Formula (7) below, an own vehicle estimated position x at each of control timings up to the N cycles before is calculated through Formula (8) below.

[Math. 2]

$$q(0)=[0,0]^T:\text{Origin}\quad(7)$$

$$q(n+1)_{k+1}=\text{Rot}_{-\Delta\theta(0)}q(n)_k+(\text{Rot}_{-\Delta\theta(0)}-I)[R(0),0]^T\quad(8)$$

$$n=-\frac{1}{T}:\text{Time-series number }\text{Rot}_\theta=$$

$$\begin{bmatrix}\cos(\theta)&-\sin(\theta)\\\sin(\theta)&\cos(\theta)\end{bmatrix}:\text{Two-dimensional rotation matrix}$$

Figure 3:
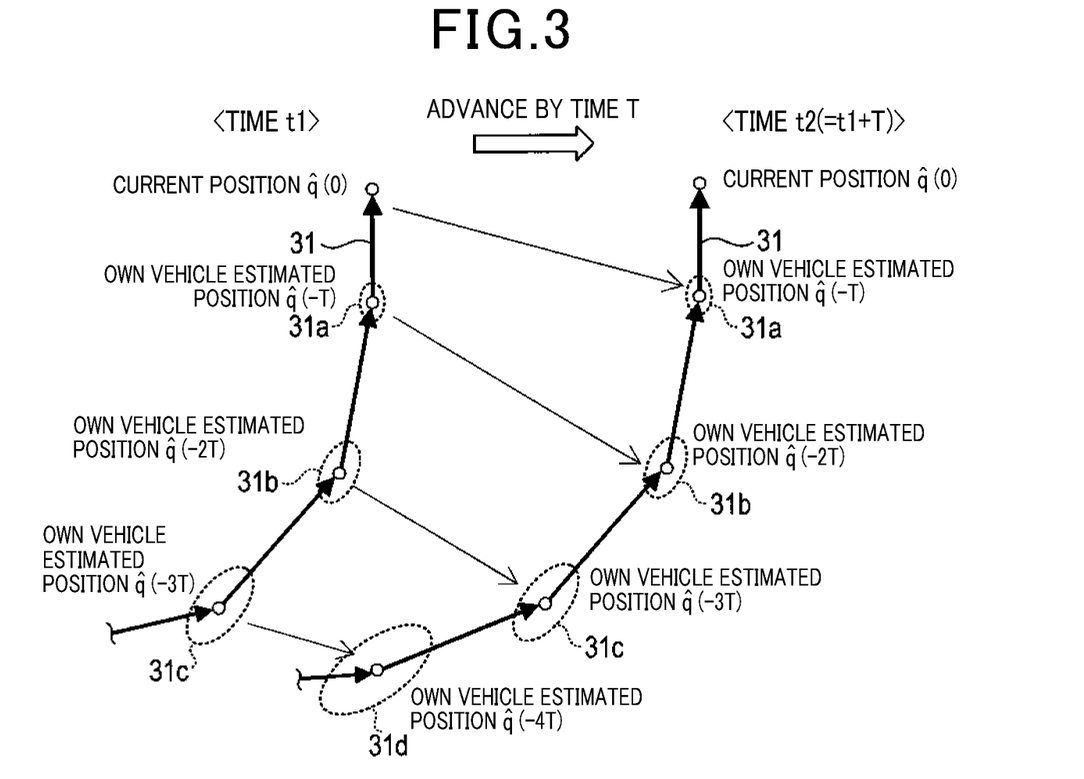
FIG. 3 is a schematic diagram illustrating a process of estimating an own vehicle travel path.

Specifically, as shown in FIG. 3, at time t1 of a control timing, the current position of the vehicle then is used as an origin to calculate own vehicle estimated positions at respective control timings up to N cycles before, using Formula (8). Then, the calculated own vehicle estimated positions are connected with lines to produce an own vehicle travel path 31.

Furthermore, a vector in the width direction of the road is defined as follows.

[Math. 3]

$$e_n(0)=[1,0]^T\quad(9)$$

$$e_n(n+1)=\text{Rot}_{-\Delta\theta(0)}e_n(n)\quad(19)$$

Furthermore, the control unit 10 calculates error variances 31a, 31b, 31c ..., i.e., estimated-position ranges, taking account of possible errors contained in the odometry information, for the respective calculated own vehicle estimated positions.

The own vehicle estimated position before (n+1)T time can be expressed as follows.

[Math. 4]

$$\hat{q}(n+1)_{k+1}=\quad(11)$$
$$q(n+1)_{k+1}+\text{Rot}_{-\Delta\theta(0)}\tilde{q}(n)_k+\tilde{\omega}_sT\begin{bmatrix}\Delta\theta(0)&1\\-1&\Delta\theta(0)\end{bmatrix}q(n)_k-\tilde{v}_sT\begin{bmatrix}0\\1\end{bmatrix}$$

$\tilde{\omega}_s, \tilde{v}_s$: Observation error of yaw rate and observation
error of own-vehicle speed, respectively $\tilde{q}(0)_{k+1}=0$ $\hat{q}(n+1)_{k+1}$ is a normal distribution of an average $q(n+1)_{k+1}$ variance $L(n+1)_{k+1}$ In the above formula, Δθ is an attitude angle variation taking account of the error variance. The average of errors is taken to be 0. Furthermore, Formula (11) is obtained based on the relationship expressed by Formula (12), assuming that error variances $\sigma^2_{\omega s}$ and $\sigma^2_{vs}$ are already known.

[Math. 5]

$$L(n+1)_{k+1}=\text{Rot}_{-\Delta\theta(0)}L(n)_k\text{Rot}^T_{-\Delta\theta(0)}+\sigma^2_{\omega s}T^2\begin{bmatrix}\Delta\theta(0)&1\\-1&\Delta\theta(0)\end{bmatrix}\quad(12)$$

$$q(n)_kq(n)_k^T\begin{bmatrix}\Delta\theta(0)&1\\-1&\Delta\theta(0)\end{bmatrix}^T+\sigma^2_{\omega s}T^2\begin{bmatrix}0&0\\0&1\end{bmatrix}$$

In Formula (12), $L(n+1)_{k+1}$ indicates a vector from an estimated position at some time to an estimated position at the immediately preceding time.

Thus, at the control timing of time t1 shown in FIG. 3, the control unit 10 calculates the own vehicle estimated positions and the error variances at the respective control timings up to N cycles before, and the own vehicle travel path 31. Then, at time t2 that is the subsequent control timing after T seconds, the control unit 10 again calculates the own vehicle estimated positions and the error variances at the respective control timings up to N cycles before, and the own vehicle travel path 31, in completely the same manner as at time t1. In this way, the control unit 10 updates the own vehicle estimated positions and the error variances, and the own vehicle travel path at each control timing.

At S140, the control unit 10 performs an estimation of the adjacent lane. Specifically, the control unit 10 defines the position of the adjacent lane at each of the own vehicle estimated positions up to N cycles before. In this case, this process includes projecting the error variance at each own vehicle estimated position to the adjacent lane position. The adjacent lane position is defined to be the center of the adjacent lane.

Figure 4:
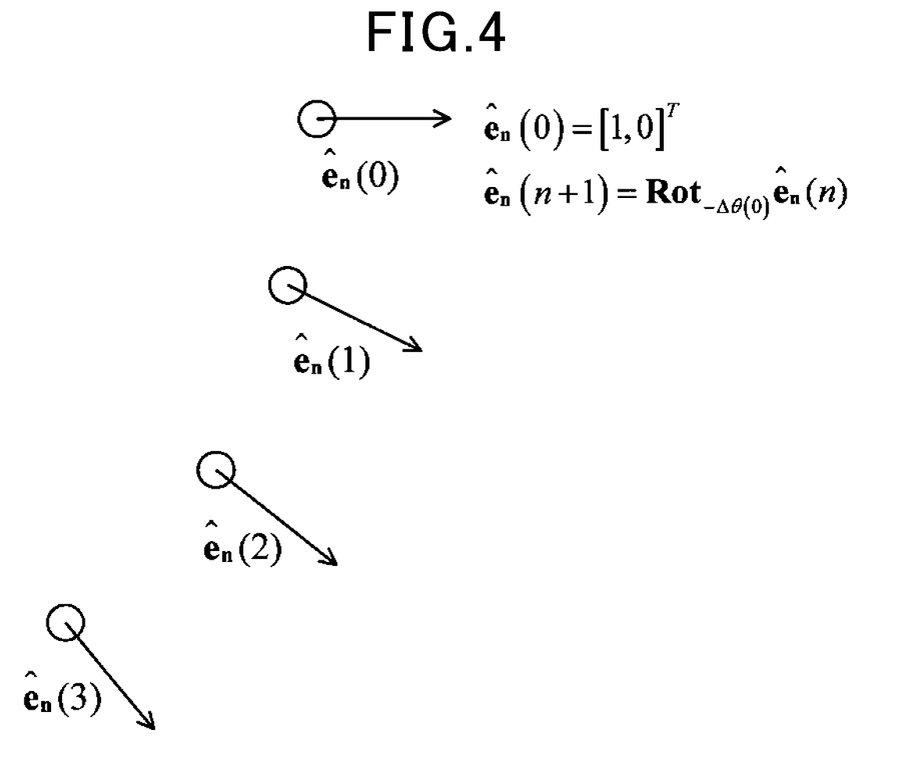
FIG. 4 is a schematic diagram illustrating a process of estimating a right lane area among other lane areas.

Specifically, as shown in FIG. 4, each own vehicle estimated position is shifted by an amount corresponding to the vector defined by the above Formulas (9) and (10), and this shifted point is defined to be the point indicating the adjacent lane. The point indicating the adjacent lane also indicates another lane area.

The vector defined by Formulas (9) and (10) is set to the length of an inter-lane distance lw (e.g., about 3.5 m), for example, which is preset along the width direction of the road. The width direction of the road in this case is taken to be a direction perpendicular to the mobile vector of the own vehicle at each point indicating the own vehicle estimated position. The inter-lane distance lw indicates a distance between the center of the own lane and the center of the adjacent lane.

Figure 5:
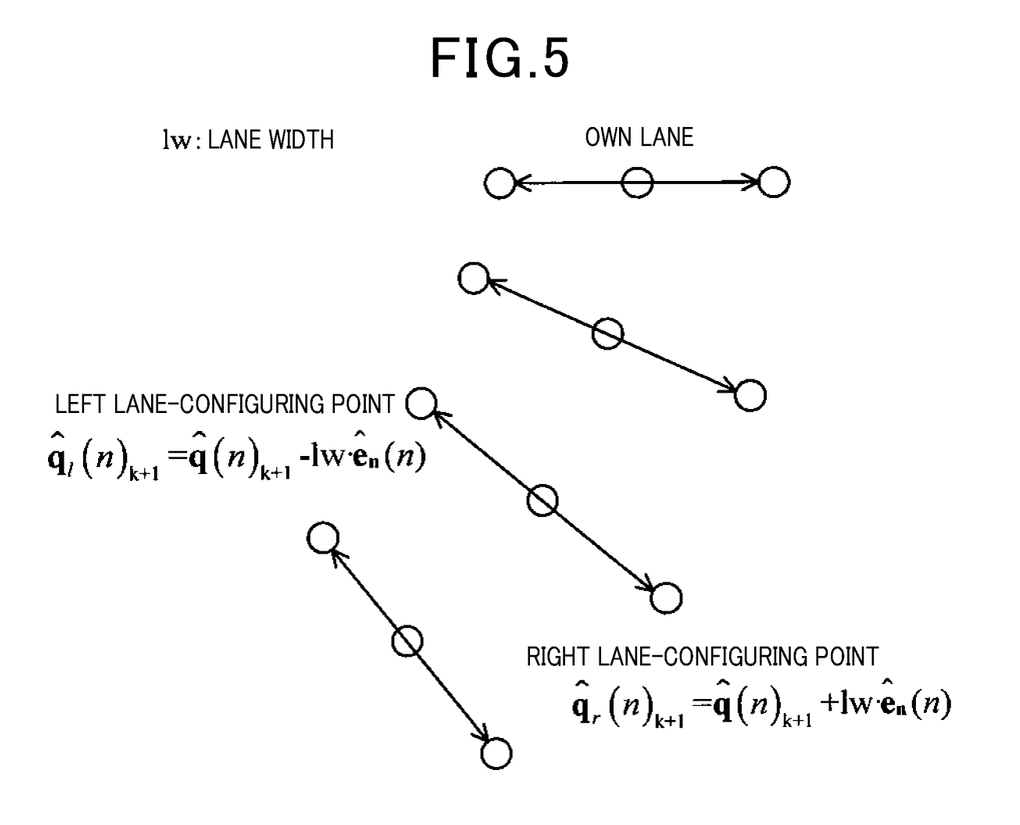
FIG. 5 is a schematic diagram illustrating a process of estimating adjacent lane areas on both sides among other lane areas.

FIG. 4 shows an example of setting an adjacent lane on the right side of the vehicle. However, in the present embodiment, adjacent lanes are respectively set, as shown in FIG. 5, on the left and right sides of the own vehicle. In this case, considering possible errors of the own vehicle estimated position, the adjacent lane can be expressed as follows.

[Math. 6]

$$\hat{q}_{lr}(n)_{k+1} = q(n)_{k+1} \pm lw \cdot \hat{e}_n(n) \quad (13)$$

$$\hat{e}_n(n) = \begin{bmatrix} \cos(\Delta\theta(t) + \Delta\tilde{\theta}(t)) & \sin(\Delta\theta(t) + \Delta\tilde{\theta}(t)) \\ -\sin(\Delta\theta(t) + \Delta\tilde{\theta}(t)) & \cos(\Delta\theta(t) + \Delta\tilde{\theta}(t)) \end{bmatrix} \begin{bmatrix} 1 \\ 0 \end{bmatrix}, \quad (14)$$

$$\Delta\tilde{\theta}(t) \sim N(0, nT^2\sigma_{\omega s}^2)$$

$$\simeq e_n(n) + \tilde{e}_n(n), \, \tilde{e}_n(n) \sim N(0, nT^2\sigma_l^2 \cdot I) \quad (15)$$

Formula (13) indicates respective positions of the left and right adjacent lanes.

Formula (14) indicates a vector taking account of possible errors. With this formula, however, linearization is difficult. Therefore, as expressed by Formula (15), a formula that has been approximated based on the isotropic Gaussian distribution is used.

Using this formula, the respective positions of the left and right adjacent lanes can be expressed by the following Formula (16).

[Math. 7]

$$\hat{q}_{lr}(n)_{k+1} \sim q_{lr}(n)_{k+1} + \tilde{q}_{lr}(n), \tilde{q}_{lr}(n) \tilde{\phantom{N}} N(0, L(n)_{k+1} + nT^2\sigma_l^2 \cdot lw^2 \cdot I) \quad (16)$$

In Formula (16), the second term on the right-hand side indicates errors contained in each point of the left or right adjacent lane.

Formula (16) can also be expressed by the following Formulas (17) and (18).

[Math. 8]

$$\hat{q}_{lr}(n)_{k+1} \sim q_{lr}(n)_{k+1} + \tilde{q}_{lr}(n), \tilde{q}_{lr}(n) \tilde{\phantom{N}} N(0, L_{lr}(n)_{k+1}) \quad (17)$$

$$L_{lr}(n)_{k+1} = L(n)_{k+1} + nT^2\sigma_l^2 \cdot lw^2 \cdot I \quad (18)$$

Subsequently, at S150, the control unit 10 determines the lane where another vehicle as a target is present. In the present embodiment, if the target is not present in the adjacent lane, the control unit 10 also performs filtering to exclude this target.

Specifically, a state of the target is defined by the following formula.

$$x = [x, y, \dot{x}, \dot{y}]^T \quad [\text{Math. 9}]$$

Specifically, a state of the target includes the position and the speed of the target.

Then, the lane where the following candidate is located is determined.

$$\hat{x}_0 \quad [\text{Math. 10}]$$

Specifically, the control unit 10 determines the lane where this candidate is present. In the present specification, the caret (^) affixed to $x_0$ or other symbols is omitted. Each caret in the formulas indicates that the value includes errors. Each tilde (~) in the formulas indicates an approximation. Each top bar (¯) in the formulas indicates an average.

When determining a lane, for example, the following processes are taken.

[Process 1] A point nearest to the candidate $x_0$ is searched for among the points on the own vehicle travel path.

[Math. 11]

$$\text{Point nearest to } \hat{X}_0 \text{ from } \hat{q}\left(n = -\frac{t}{T}\right), t = 0, \ldots, -NT$$

Figure 6:
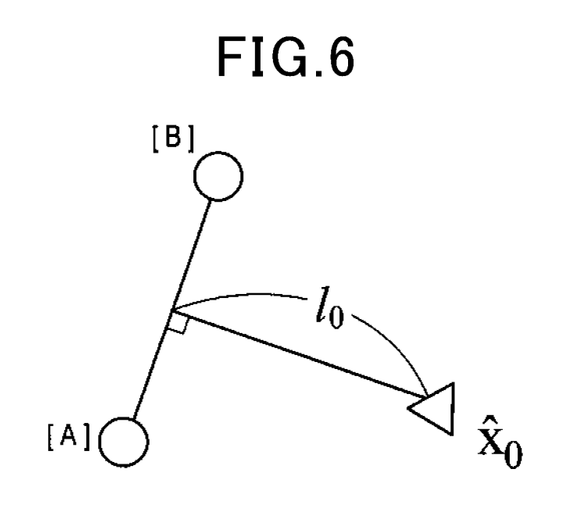
FIG. 6 is a schematic diagram illustrating a process of specifying a lane where a target is located.

For example, in the example shown in FIG. 6, the point [A] is the nearest to the $x_0$.

[Process 2] A point second nearest to the candidate $x_0$ is searched for among the points on the own vehicle travel path. For example, in the example shown in FIG. 6, the point [B] is the second nearest to the candidate $x_0$.

[Process 3] A distance $l_0$ from the line segment connecting the points [A] and [B] to the candidate $x_0$ is calculated.

[Process 4] If the distance $l_0$ is less than lw/2 that is a half of the inter-lane distance lw, the candidate $x_0$ is determined to be present in the own lane, and if the distance $l_0$ is between lw/2 and 3lw/2, the candidate $x_0$ is determined to be present in the adjacent lane. In this case, depending on which of the right and left sides of the line segment the candidate $x_0$ is present, it is determined whether the candidate $x_0$ is positioned in the right side adjacent lane or in the left side adjacent lane.

[Process 5] If the candidate $x_0$ in an adjacent lane alone is targeted, the candidate $x_0$ in the own lane or in other lane is excluded.

Then, at S160, the target is identified. Target identification refers to identifying whether the detected another vehicle is a newly detected target, or whether the detected another vehicle is a target that has already been detected. Target identification is performed, for example, based on whether the candidate $x_0$ is present within the error range indicated by $x_{k+1}$ that has been obtained at previously executed S170, which will be described below.

If the candidate $x_0$ is present within the error range indicated by the other vehicle is assumed to be a target that has already been detected and is continuously tracked. If the candidate $x_0$ is not present within the error range indicated by $x_{k+1}$, the other vehicle is treated as a new target.

Then, at S170, the control unit 10 performs target tracking for another vehicle position. Specifically, the control unit 10 estimates a future position of the other vehicle to keep track of the other vehicle.

Figure 7:
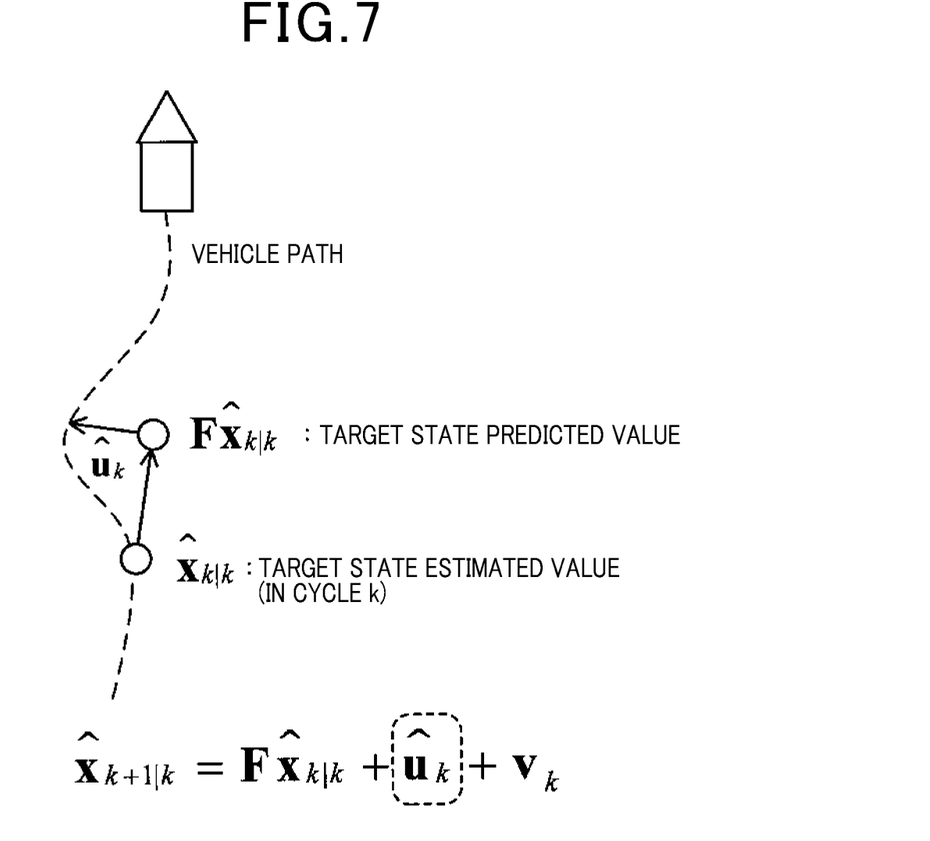
FIG. 7 is a schematic diagram illustrating target tracking.

At this step, as shown in FIG. 7, a future position of the other vehicle is estimated, assuming that the other vehicle moves along the own vehicle travel path or in an other lane area. Specifically, as shown in FIG. 7, a provisional position of the other vehicle is estimated based on a target state estimated value $x_{k|k}$ that includes the current position of the other vehicle, and a target state predicted value $Fx_{k|k}$ that is a mobile vector of the other vehicle. Then, the provisional position is corrected in terms of the own vehicle travel path or in terms of an other lane area, using a correction vector $u_k$, and this corrected position is estimated as a future position of the other vehicle.

Figure 8:
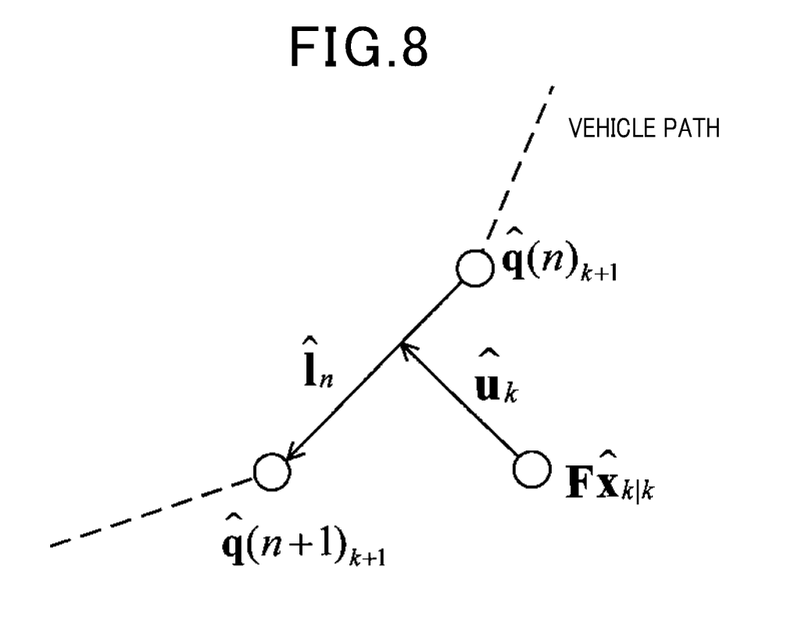
FIG. 8 is a schematic diagram illustrating a process of dropping a perpendicular line toward a nearest line segment.

As shown in FIG. 8, the own vehicle travel path and the other lane area are each include a plurality of nodes $q(n)_{k+1}$, $q(n+1)_{k+1}$ indicating points thereon, and links $I_n$ as line segments connecting these nodes. The control unit 10 selects a link that is nearest from the provisional position defined by the $Fx_{k|k}$. Then, the provisional position is corrected in terms of the selected link, and this corrected position is estimated as a future position of the other vehicle.

In this case, a distance from the provisional position to the selected link is calculated, and the average of such distances and errors are summed. Then, using a correction vector indicated by the sum, the provisional position is corrected in terms of the selected link. When estimating a future position of the other vehicle, the control unit 10 uses a Kalman filter taking account of possible errors of the other vehicle position information.

Specifically, for example, the following formula is used for the calculation.

More specifically, a perpendicular line is dropped on a link which is nearest from the provisional position defined by the $Fx_{k|k}$ by using the following formula.

[Math. 12]

$$\hat{u}_k(\hat{P}_{lxy} - I)F\hat{x}_{k|k} - (\hat{P}_{lxy} - I)\begin{bmatrix} \hat{q}(n)_{k+1} \\ 0 \end{bmatrix} \hat{P}_{lxy} = blkdiag(\hat{P}_{ln}, \hat{P}_{ln}), \quad (19)$$

$$\hat{P}_{ln} = \frac{\hat{I}_n \hat{I}_n^T}{\|\hat{I}_n\|^2}$$

In this formula, $I_n$ is an estimated amount and has errors. Accordingly, a predicted position $x_{k+1|k}$ can be expressed as follows.

[Math. 13]

$$\tilde{x}_{k+1|k} = P_{lxy}F\hat{x}_{k|k} - (\hat{P}_{lxy} - I)\begin{bmatrix} \hat{q}(n)_{k+1} \\ 0 \end{bmatrix} + v_k \quad (20)$$

$$\hat{P}_{lxy} = blkdiag(\hat{P}_{ln}, \hat{P}_{ln}), \hat{P}_{ln} = \frac{\hat{I}_n \hat{I}_n^T}{\|\hat{I}_n\|^2} \quad (21)$$

As in the following formula, the predicted position $x_{k+1|k}$ may be expressed in the form of a sum of the average and errors.

[Math. 14]

$$\hat{x}_{k+1|k} = \overline{x}_{k+1|k} + \tilde{x}_{k+1|k} \quad (22)$$

The term indicating errors in the above Formula (22) can be expressed as follows by approximating the above Formulas (20), (21) and (22), the correlation of the errors $P_{ln}$ with $q(n)_{k+1}$, and the $q(n)_{k+1}$ being independent of $x_{k|k}$.

[Math. 15]

$$\tilde{x}_{k+1|k} = \quad (23)$$

$$\hat{P}_{lxy}Fx_{k|k} + \hat{P}_{lxy}F\tilde{x}_{k|k} - (\hat{P}_{lxy} - I)\begin{bmatrix} \tilde{q}(n)_{k+1} \\ 0 \end{bmatrix} - \tilde{P}_{lxy}\begin{bmatrix} \tilde{q}(n)_{k+1} \\ 0 \end{bmatrix} + v_k$$

From the above, a predicted position of the other vehicle is finally obtained as the following Formula (24). In Formula (24), $v_k$ indicates noise according to the Gaussian distribution, for expressing random acceleration of the vehicle.

[Math. 16]

System equation $$X_{k+1} = Fx_k + \underbrace{u_k}_{\text{Control input term}} + v_k \quad (24)$$

Observation equation $$Z_{k+1} = Hx_{k+1} + w_{k+1} \quad (25)$$

Control input $$u_k = (P_{lxy} - I)Fx_k - (P_{lxy} - I)\begin{bmatrix} q(n)_{k+1} \\ 0 \end{bmatrix} \quad (26)$$

$$P_{lxy} = blkdiag(P_{ln}, P_{ln}), P_{ln} = \frac{I_n I_n^T}{\|I_n\|^2} \quad (27)$$

$$I_n = q(n+1)_{k+1} - q(n)_{k+1} \quad (28)$$

It should be noted that Formula (25) expresses an observation process, and Formulas (25), (26) and (27) are used for solving Formula (24). Based on these calculations, a future position of another vehicle can be estimated.

Then, at S180, the control unit 10 extracts an alarm object. Specifically, if a target is determined to be present in the adjacent lane, the control unit 10 confirms the positional relationship between the target and the own vehicle. Then, if the positional relationship between both satisfies predetermined conditions, the target is extracted as an alarm object. The predetermined conditions may, for example, be that the relative distance, which is the distance between the own vehicle and the target, is not more than a predetermined distance, or the decrease rate of the relative distance is not less than a predetermined decrease rate, or both of these conditions.

At S190, the control unit 10 executes an alarm output process. Specifically, if an alarm object is extracted at S180, the control unit 10 allows the alarm device 4 to output an alarm indicative of the presence of the alarm object.

[1-3. Advantageous Effects]

The embodiment described above in detail yields advantageous effects as follows.

(1a) The in-vehicle system 1 includes the control unit 10. The control unit 10 is configured to acquire another vehicle information that includes a current position of another vehicle around the own vehicle. The control unit 10 is configured to acquire an own vehicle travel path that indicates a path along which the own vehicle has traveled.

The control unit 10 is configured to use the own vehicle travel path as a basis for estimating an other lane area that is a lane in which the other vehicle is present and which is different from an own lane that is a lane in which the own vehicle is present. The control unit 10 is configured to estimate a future position of the other vehicle indicated by the other vehicle information, assuming that the other vehicle moves along the own vehicle travel path or in the other lane area.

According to the in-vehicle system 1 configured as above, a future position of the other vehicle is estimated, assuming that the other vehicle moves along the own vehicle travel path or in the other lane area. Thus, the movement of the other vehicle can be correctly estimated, irrespective of the curvature of the road.

(1b) In the in-vehicle system 1, the control unit 10 is configured to iterate estimation of a future position of the other vehicle, to compare the previously obtained future position of the other vehicle with the current position of the other vehicle obtained in the present cycle, and, if these positions are close to each other, the control unit 10 recognizes that these other vehicles arise from the same object.

According to the in-vehicle system 1 configured as above, the other vehicles are determined to represent the same object, based on the repeatedly obtained positions of the other vehicle. Thus, the other vehicle can be tracked with high accuracy.

(1c) In the in-vehicle system 1, the control unit 10 is configured to exclude another vehicle located in an area other than the lane that has been preset by performing filtering based on the current position of the other vehicle.

According to the in-vehicle system 1 configured as above, filtering is performed based on the current positions of the other vehicle. Thus, the other vehicle can be tracked, with unwanted data being excluded. Thus, the other vehicle can be tracked with high accuracy.

(1d) In the in-vehicle system 1, the control unit 10 is configured to also acquire a current mobile vector of another vehicle as another vehicle information. Furthermore, the control unit 10 is configured to estimate a provisional position of the other vehicle, based on the current position and the mobile vector of the other vehicle, and to correct the provisional position in terms of the own vehicle travel path or in terms of the other lane area to use the corrected position as an estimated future position of the other vehicle.

According to the in-vehicle system 1 as described above, the position obtained by using the current mobile vector of the other vehicle is corrected in terms of the own lane or in terms of other lane. Thus, a future position of the other vehicle can be estimated through a simple process.

(1e) In the in-vehicle system 1, the own vehicle travel path and the other lane area each includes a plurality of nodes indicating points thereon, and links as line segments connecting these nodes. The control unit 10 selects a link that is nearest from the provisional position, and corrects the provisional position in terms of the selected link to use the corrected position as an estimated future position of the other vehicle.

According to the in-vehicle system 1 configured as above, it is estimated which of the own vehicle travel path and the other lane area the other vehicle is located, by selecting a nearest link, and the position of the other vehicle is set on the link. Thus, the position of the other vehicle can be estimated with high accuracy.

(1f) In the in-vehicle system 1, the control unit 10 is configured to calculate a distance from a provisional position to a selected link, and the average of such distances and errors are summed. Then, using a correction vector indicated by the sum, the provisional position is corrected in terms of the selected link.

According to the in-vehicle system 1 configured as above, since a correction vector indicated by the sum of an average of distances from the provisional position to the selected link and errors is used, errors can be simply expressed.

(1g) In the in-vehicle system 1, the control unit 10 is configured to use a Kalman filter that takes account of possible errors of the other vehicle position information, when estimating a future position of another vehicle.

According to the in-vehicle system 1 configured as above, since a Kalman filter that takes account of possible errors of the other vehicle position information is used when estimating a future position of another vehicle, a future position of the other vehicle can be estimated with high accuracy, taking account of the errors.

(1h) The in-vehicle system 1 is configured to iterate update of the current position of the own vehicle, and generate the own vehicle travel path, which includes errors due to use of error variances, when updating the current position of the own vehicle. Also, the control unit 10 estimates the other lane area and the future position of the other vehicle, taking account of possible errors of the own vehicle travel path.

According to the in-vehicle system configured as above, an own vehicle travel path can be estimated, taking account of error variances.

2. Other Embodiments

An embodiment of the present disclosure has been described so far, but the present disclosure should not be limited to the embodiments described above and can be implemented in various modes.

(2a) In the embodiment described above, the position of the adjacent lane is estimated at S140. However, the control unit may estimate not only the adjacent line, but also the other lane area where the other lane different from the own lane is present.

(2b) In the embodiment described above, the control unit compares, at S160, a previously obtained future position of the other vehicle with the current position of the other vehicle obtained in the present cycle, and, if the current position is within a range of future position errors, determines these positions are close to each other. However, configuration is not limited to this. For example, "being close to each other" refers to satisfying preset proximity conditions, e.g., satisfying that each other's positions are within a preset distance. Accordingly, if selected proximity conditions are satisfied, the current position may be determined to be close to a future position.

(2c) A plurality of functions of one component in the embodiments described above may be implemented by a plurality of components, or one function of one component may be implemented by a plurality of components. Alternatively, a plurality of functions of a plurality of components may be implemented by one component, or one function implemented by a plurality of components may be implemented by one component. Furthermore, part of the configurations of the embodiments described above may be omitted. Furthermore, at least part of the configuration of an embodiment described above may be added to or replaced by another configuration of the embodiment described above. All the modes included in the technical idea as defined by the language of the claims should be the embodiments of the present disclosure.

(2e) Bedsides the in-vehicle system 1 described above, the present disclosure may be implemented in various modes, such as a device as a component of the in-vehicle system 1, a program for functioning a computer as the in-vehicle system 1, a non-transitory tangible recording medium such as a semiconductor memory storing the program, and another lane monitoring method.

3. Correspondence Between the Configuration of the Embodiments and the Configuration of the Present Disclosure In the embodiment described above, the driving support ECU 2 corresponds to the other lane monitoring device of the present disclosure. Of the steps executed by the control unit 10 of the driving support ECU 2, S110 corresponds to the other vehicle acquisition section of the present disclosure, and S130 corresponds to the path acquisition section or the path generation section of the present disclosure. S140 corresponds to the lane estimation section of the present disclosure, and S160 corresponds to the identify recognition section of the present disclosure. S170 corresponds to the position estimation section of the present disclosure.

The invention claimed is:

1. An other lane monitoring device installed in an own vehicle, comprising:
   an other vehicle acquisition section configured to acquire other vehicle position information that includes a current position of an other vehicle near the own vehicle;
   a path acquisition section configured to acquire an own vehicle travel path that indicates a path along which the own vehicle has traveled based on acquired odometry information of the own vehicle at prior control timings that are prior to a present control timing;
   a lane estimation section configured to estimate an other lane area where an other lane is present based on the own vehicle travel path, the other lane comprising a lane adjacent to an own lane where the own vehicle is present; and
   a position estimation section configured to estimate a future position of the other vehicle based on the other vehicle position information for a state in which the other vehicle moves along the own vehicle travel path or in the other lane area, wherein
   the other vehicle acquisition section is configured to acquire a current mobile vector of the other vehicle as the other vehicle position information, in addition to the current position of the other vehicle, and
   the position estimation section is configured to estimate a provisional position of the other vehicle, based on the current position and the mobile vector of the other vehicle, to correct the provisional position in terms of the own vehicle travel path or in terms of the other lane area, and to estimate the corrected provisional position as the future position of the other vehicle.

2. The other lane monitoring device according to claim 1, wherein
   the position estimation section is configured to iterate estimation of the future position of the other vehicle; and
   the other lane monitoring device further comprises an identify recognition section that is configured to compare the future position of the other vehicle previously obtained by the position estimation section, with the current position of the other vehicle currently obtained by the other vehicle acquisition section, and, if the future position of the other vehicle and the current position of the other vehicle are close to each other, recognize the other vehicle in the future position and the current position as representing the same other vehicle.

3. The other lane monitoring device according to claim 2, wherein
   the identify recognition section is configured to perform filtering based on the current position of the other vehicle to exclude other vehicles located in an area other than a preset lane.

4. The other lane monitoring device according to claim 1, wherein
   the own vehicle travel path and the other lane area respectively includes a plurality of nodes representing points on the own vehicle travel path and on the other lane area, and links as line segments connecting between the plurality of nodes; and
   the position estimation section is configured to select a nearest link from the provisional position, to correct the provisional position in terms of the selected link, and to estimate the corrected provisional position as the future position of the other vehicle.

5. The other lane monitoring device according to claim 4, wherein
   the position estimation section is configured to calculate a sum of an average and errors of distances from the provisional position to individual selected links, and to use a correction vector indicated by the sum to correct the provisional position in terms of the selected link.

6. The other lane monitoring device according to claim 1, wherein
   the position estimation section is configured to use a Kalman filter that takes account of errors of the other vehicle position information, when estimating the future position of the other vehicle.

7. The other lane monitoring device according to claim 1, wherein
   the other lane monitoring device further comprises a path generation section configured to iterate update of a current position of the own vehicle, and to generate an own vehicle travel path that includes errors due to use of error variances, when updating the current position of the own vehicle; and
   the path acquisition section is configured to acquire an own vehicle travel path generated by the path generation section.

* * * * *